(12) United States Patent
Kim et al.

(10) Patent No.: US 11,612,021 B2
(45) Date of Patent: Mar. 21, 2023

(54) INDUCTION HEATING DEVICE HAVING IMPROVED INSULATION STRUCTURE

(71) Applicant: LG Electronics Inc., Seoul (KR)

(72) Inventors: Seongjun Kim, Seoul (KR); Jaekyung Yang, Seoul (KR); Yongsoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 562 days.

(21) Appl. No.: 16/678,795

(22) Filed: Nov. 8, 2019

(65) Prior Publication Data

US 2020/0154530 A1     May 14, 2020

(30) Foreign Application Priority Data

Nov. 8, 2018    (KR) ........................ 10-2018-0136323

(51) Int. Cl.
    *H05B 6/12*     (2006.01)
    *H05B 6/02*     (2006.01)

(52) U.S. Cl.
    CPC ................................. *H05B 6/1254* (2013.01)

(58) Field of Classification Search
    CPC .......... H05B 2206/022; H05B 2213/03; H05B 6/1254; Y02B 40/00
    USPC ....... 219/672, 622, 620, 621, 627, 626, 667, 219/674, 675, 676
    See application file for complete search history.

(56) References Cited

U.S. PATENT DOCUMENTS

| | | | |
|---|---|---|---|
| 6,384,387 B1* | 5/2002 | Owens .................. | A47J 47/145 219/601 |
| 8,440,944 B2 | 5/2013 | Acero et al. | |
| 2007/0278215 A1* | 12/2007 | Schilling ............. | H05B 6/1263 219/622 |
| 2018/0213613 A1 | 7/2018 | Matulla et al. | |

FOREIGN PATENT DOCUMENTS

| | | | |
|---|---|---|---|
| CN | 2746701 Y | * | 12/2005 |
| DE | 102013218714 | | 4/2014 |
| EP | 3139702 | | 3/2017 |
| JP | 2011090991 | | 5/2011 |

OTHER PUBLICATIONS

Translation of CN2746701Y, "Heating coil tray for electromagnetic oven", Dec. 14, 2005. By ProQuest (Year: 2005).*
Translation of JP 2011090991A. "Induction Cooking Device", May 6, 2011. By ProQuest. (Year: 2011).*
Extended European Search Report in European Application No. 19204514.4, dated Mar. 19, 2020, 10 pages.

\* cited by examiner

*Primary Examiner* — Quang T Van
(74) *Attorney, Agent, or Firm* — Fish & Richardson P.C.

(57) ABSTRACT

An induction heating device includes: a base plate; a working coil disposed vertically above the base plate, the working coil including a conducting wire that is annularly wound; a ferrite core that is disposed on an upper surface of the base plate, that is disposed vertically below the working coil, and that is configured to direct upward an alternating magnetic field generated by the working coil; and an insulating member attached to an outer portion of the ferrite core and configured to electrically insulate the working coil from the base plate.

18 Claims, 11 Drawing Sheets

INDUCTION HEATING DEVICE HAVING IMPROVED INSULATION STRUCTURE

CROSS-REFERENCE TO RELATED APPLICATION

The present disclosure claims priority to and the benefit of Korean Patent Application No. 10-2018-0136323, filed on Nov. 8, 2018, the disclosure of which is incorporated herein by reference in its entirety.

TECHNICAL FIELD

The present disclosure relates to an induction heating device having an improved insulation structure.

BACKGROUND

Various types of cooking appliances may be used to heat food in homes and restaurants. For example, gas ranges use gas as fuel. In some examples, cooking devices may heat an object such as a cooking vessel, for example, a pot, with electricity instead of gas.

A method of heating an object via electricity may be classified into a resistive heating method and an induction heating method. In the electrical resistive method, heat may be generated based on current flowing through a metal resistance wire or a non-metallic heating element, such as silicon carbide, and the heat may be transmitted to the object through radiation or conduction, to heat the object. In the induction heating method, eddy current may be generated in the object made of metal based on a magnetic field generated around the coil based on a high-frequency power having a predetermined magnitude applied to the coil to heat the object.

Induction heating devices that use an induction heating method may include working coils located respectively in corresponding regions to heat each of a plurality of objects (e.g., cooking vessels).

In some cases, an induction heating device (i.e., a zone-free type induction heating device) may simultaneously heat one object with a plurality of working coils.

In some cases, a zone-free type induction heating device may inductively heat an object regardless of a size and a position of the object that is disposed in a region in which a plurality of working coils are present.

FIG. 1 is an exploded perspective view showing a working coil assembly provided in an induction heating device in related art. FIG. 2 is a perspective view in which some components of the working coil assembly is omitted from FIG. 1.

Referring to FIG. 1, a working coil assembly 10 provided in the induction heating device in related art may include a working coil 16, mica sheets 18 and 20, and a ferrite core 26.

In some cases, where the ferrite core 26 has a size greater than the size of the working coil 16, an amount of magnetic flux leaking below the working coil may be reduced. Thus, the ferrite core has the size greater than the size of the working coil, so that high-output is obtained based on a relatively less current.

Referring to FIG. 2, the induction heating device in related art may include a mica sheet 20 having a diameter greater than a diameter of the ferrite core 26, so that a creepage distance to insulate the working coil 16 (i.e., a creepage distance required to prevent electric shock accidents occurring due to the current of the working coil 16) is provided.

In some cases, a plurality of working coil assemblies may have a honeycomb structure, and a small-sized working coil may be used to provide a distance between ferrite cores, and the creepage distance described above.

In some cases, it may be difficult to obtain high-output in the induction heating device in related art, due to the small size of the working coil.

SUMMARY

The present disclosure provides an induction heating device capable of using a high-output working coil.

The present disclosure also provides an induction heating device capable of providing a creepage distance to insulate a working coil.

The objects of the present disclosure are not limited to the above-mentioned objects, and other objects and advantages of the present disclosure which are not mentioned may be understood by the following description and more clearly understood by the implementations of the present disclosure. It will also be readily apparent that the objects and advantages of the present disclosure may be implemented by means defined in claims and a combination thereof.

According to one aspect of the subject matter described in this application, an induction heating device includes: a base plate; a working coil disposed vertically above the base plate, the working coil including a conducting wire that is annularly wound; a ferrite core that is disposed on an upper surface of the base plate, that is disposed vertically below the working coil, and that is configured to direct upward an alternating magnetic field generated by the working coil; and an insulating member attached to an outer portion of the ferrite core and configured to electrically insulate the working coil from the base plate.

Implementations according to this aspect may include one or more of the following features. For example, the outer portion of the ferrite core may include: a first outer portion that extends along a first longitudinal direction; a second outer portion that extends along a second longitudinal direction orthogonal to the first longitudinal direction; a third outer portion that is spaced apart from the first outer portion in the second longitudinal direction and that extends parallel to the first longitudinal direction; and a fourth outer portion that is spaced apart from the second outer portion in the first longitudinal direction and that extends parallel to the second longitudinal direction. The insulating member may include a first insulating member attached to the first outer portion, a second insulating member attached to the second outer portion, a third insulating member attached to the third outer portion, and a fourth insulating member attached to the fourth outer portion.

In some examples, the first insulating member may surround an upper surface, a side surface, and a lower surface of the first outer portion, and the second insulating member may surround an upper surface, a side surface, and a lower surface of the second outer portion. The third insulating member may surround an upper surface, a side surface, and a lower surface of the third outer portion, and the fourth insulating member may surround an upper surface, a side surface, and a lower surface of the fourth outer portion.

In some implementations, the outer portion may extend along a longitudinal direction of the ferrite core, where a length of the insulating member in the longitudinal direction is less than a length of the outer portion in the longitudinal direction. In some examples, the insulating member may include a Kapton tape.

In some implementations, the induction heating device may further include a first mica sheet disposed between the working coil and the ferrite core and configured to block heat transfer from the working coil to the ferrite core. In some examples, the first mica sheet may be fixed to each of the working coil and the ferrite core by a sealant. In some examples, a creepage distance between a lower surface of the working coil and the base plate may be greater than or equal to 6.4 mm.

In some implementations, the induction heating device may further include a second mica sheet fixed to an upper end of the working coil by a sealant. In some implementations, the base plate, the ferrite core, the first mica sheet, and the working coil are stacked along a height direction, where the ferrite core may define a core hole at a center area of the ferrite core that corresponds to an annular inner side of the working coil. The first mica sheet may define a first sheet hole at a center area of the first mica sheet that corresponds to the annular inner side of the working coil, and the base plate may define a plate hole at a position corresponding to the annular inner side of the working coil. The core hole, the first sheet hole, and the plate hole may have a same shape and be coaxially arranged along the height direction.

In some implementations, the induction heating device may further include: a packing gasket that is configured to fix the first mica sheet and the ferrite core to the base plate and that is inserted into the first sheet hole, the core hole, and the plate hole; and a sensor disposed at an upper end of the packing gasket and configured to detect a temperature of the packing gasket, where an outer circumferential shape of the packing gasket corresponds to a circumferential shape of the first sheet hole. In some examples, the packing gasket may have a circular shape and is configured to be disposed within the inner annular side of the working coil, where an outer circumferential surface of the packing gasket faces the inner annular side of the working coil.

In some implementations, the packing gasket may include a plurality of protrusions that protrude outward from an outer circumferential surface of the packing gasket, and the first mica sheet may further define a plurality of grooves that extend outward from the first sheet hole and that are configured to receive the plurality of protrusions of the packing gasket. In some examples, the plurality of grooves may be arranged about the center area of the first mica sheet.

In some implementations, the ferrite core may include a step portion recessed from a corner of the ferrite core, where the first mica sheet may include a step part that is recessed from at a corner of the first mica sheet and that corresponds to the step portion of the ferrite core.

In some implementations, the ferrite core further may include a step portion that is recessed from each of (i) a first corner between the first outer portion and the second outer portion, (ii) a second corner between the second outer portion and the third outer portion, (iii) a third corner between the third outer portion and the fourth outer portion, and (iv) a fourth corner between the fourth outer portion and the first outer portion. In some examples, the induction heating device may further include a first mica sheet disposed between the working coil and the ferrite core and configured to block heat transfer from the working coil to the ferrite core, where the first mica sheet may include a step part that is disposed at each corner of the first mica sheet and that corresponds to one of the step portions of the ferrite core.

In some implementations, the insulating member may include: a first insulating member attached to the first outer portion between the fourth corner and the first corner; a second insulating member attached to the second outer portion between the first corner and the second corner; a third insulating member attached to the third outer portion between the second corner and the third corner; and a fourth insulating member attached to the fourth outer portion between the third corner and the fourth corner. In some examples, a distance between a first end of the first insulating member and the first corner is greater than or equal to a distance between a second end of the first insulating member and the fourth corner.

In some examples, the base plate is made of aluminum (Al).

In some implementations, the induction heating device may provide a creepage distance to insulate the working coil by adding an insulating member, rather than a reduction of a size of the working coil, so that the induction heating device may use a high-output working coil.

In some implementations, the induction heating device may include an insulating member attached to an outer portion of the ferrite core, thereby providing the creepage distance to insulate the working coil.

In some implementations, the induction heating device may use the high-output working coil, thereby improving performance and reliability of the product.

In some implementations, the induction heating device may prevent electric shock accidents by providing the creepage distance to insulate the working coil, thereby improving user satisfaction.

Hereafter, a specific effect of the present disclosure, further to the above-mentioned effect, is described together while describing a specific matter for implementing the present disclosure.

DETAILED DESCRIPTION

Figure 1:
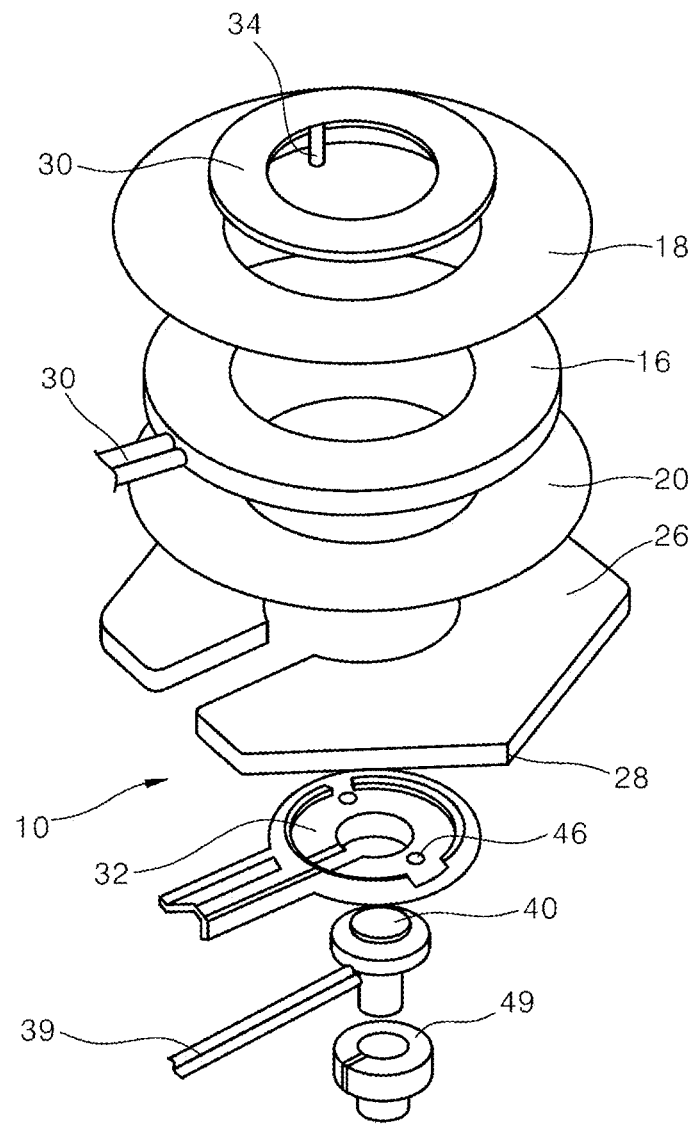
FIG. 1 is an exploded perspective view showing a working coil assembly in related art.
Figure 2:
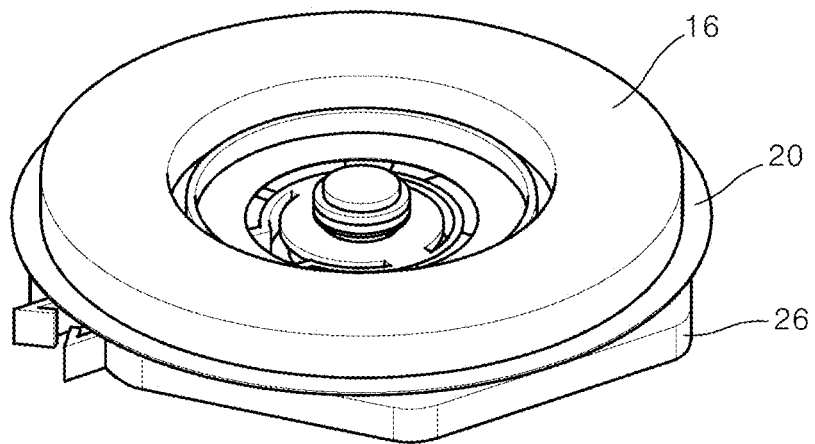
FIG. 2 is a perspective view showing the working coil assembly in FIG. 1.

The above mentioned objects, features, and advantages of the present disclosure are described in detail with reference to the accompanying drawings, so that those skilled in the art to which the present disclosure pertains may easily implement the technical idea of the present disclosure. In the description of the present disclosure, when it is determined that the detailed description of the known technology related to the present disclosure may obscure the gist of the present disclosure, the detailed description thereof is omitted. Hereinafter, one or more implementations of the present disclosure are described in detail with reference to the accompanying drawings. A same reference numeral in the drawings is used to indicate same or similar component.

Hereinafter, according to an implementation of the present disclosure, an induction heating device is described.

Figure 3:
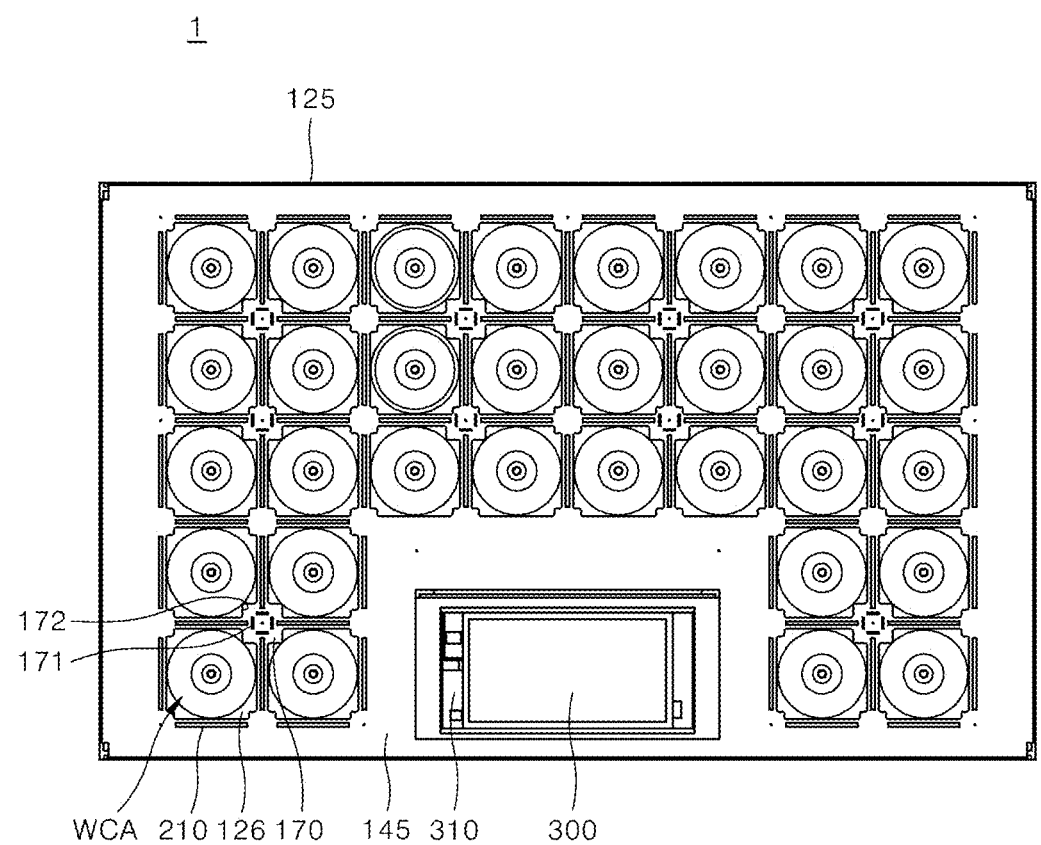
FIG. 3 is a plan view showing an example of an induction heating device according to the present disclosure.
Figure 4:
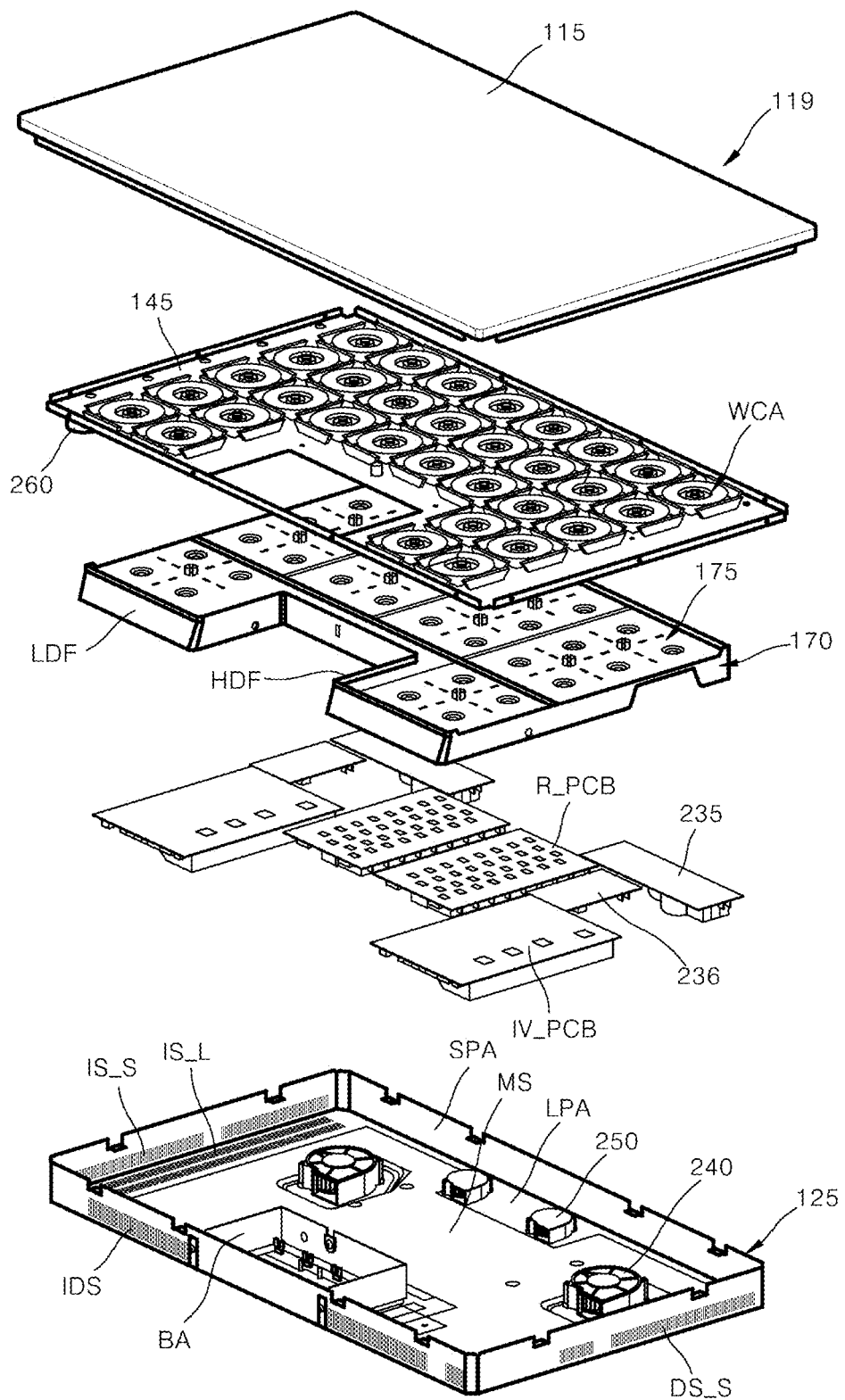
FIG. 4 is an exploded perspective view showing the induction heating device in FIG. 3.
Figure 5:
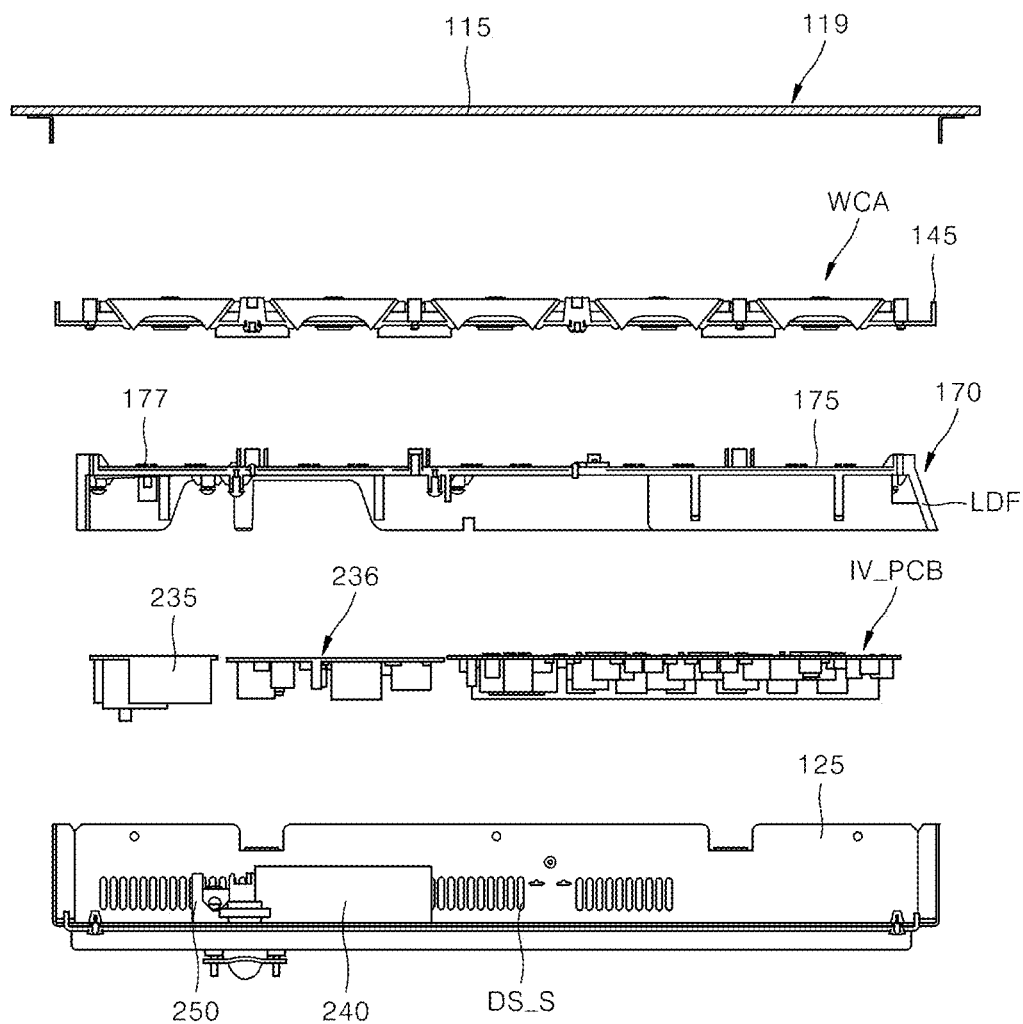
FIG. 5 is a cross-sectional view showing the induction heating device in FIG. 4.
Figure 6:
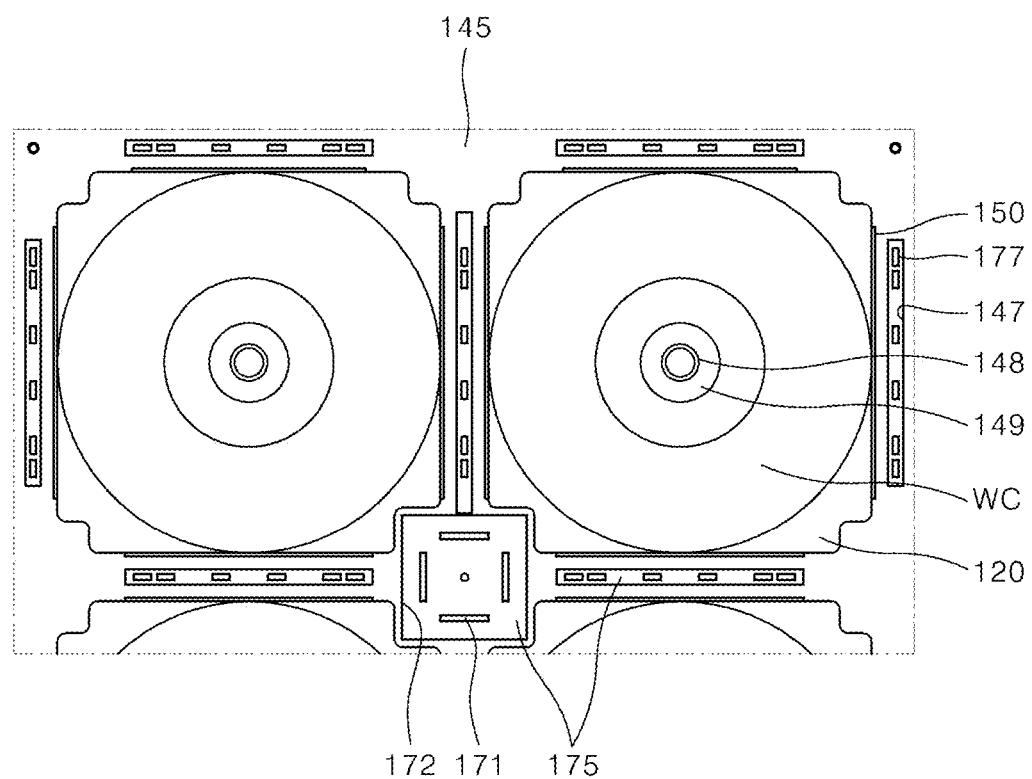
FIGS. 6 to 8 are partially enlarged views showing the induction heating device in FIG. 3.
Figure 7:
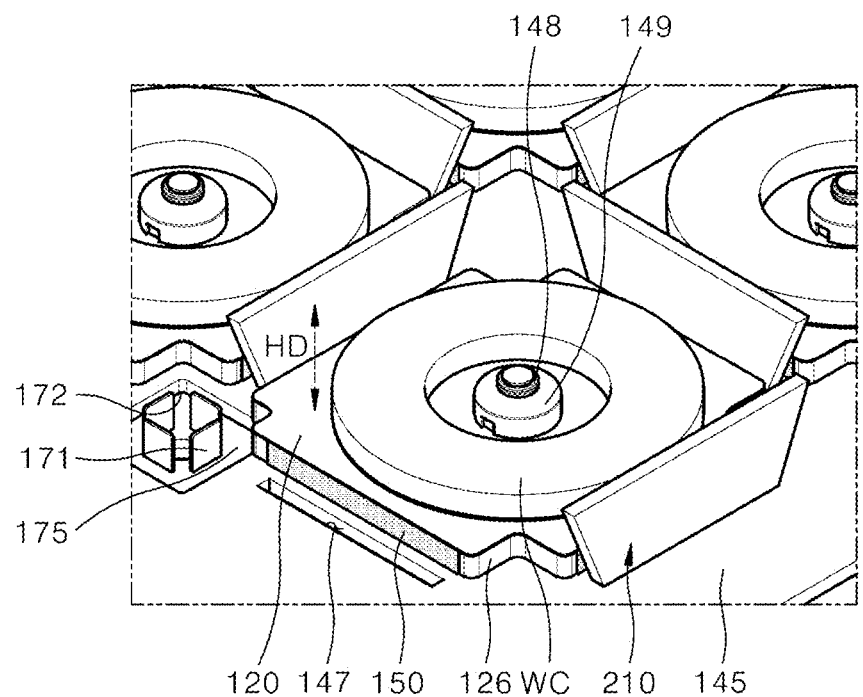
Figure 8:
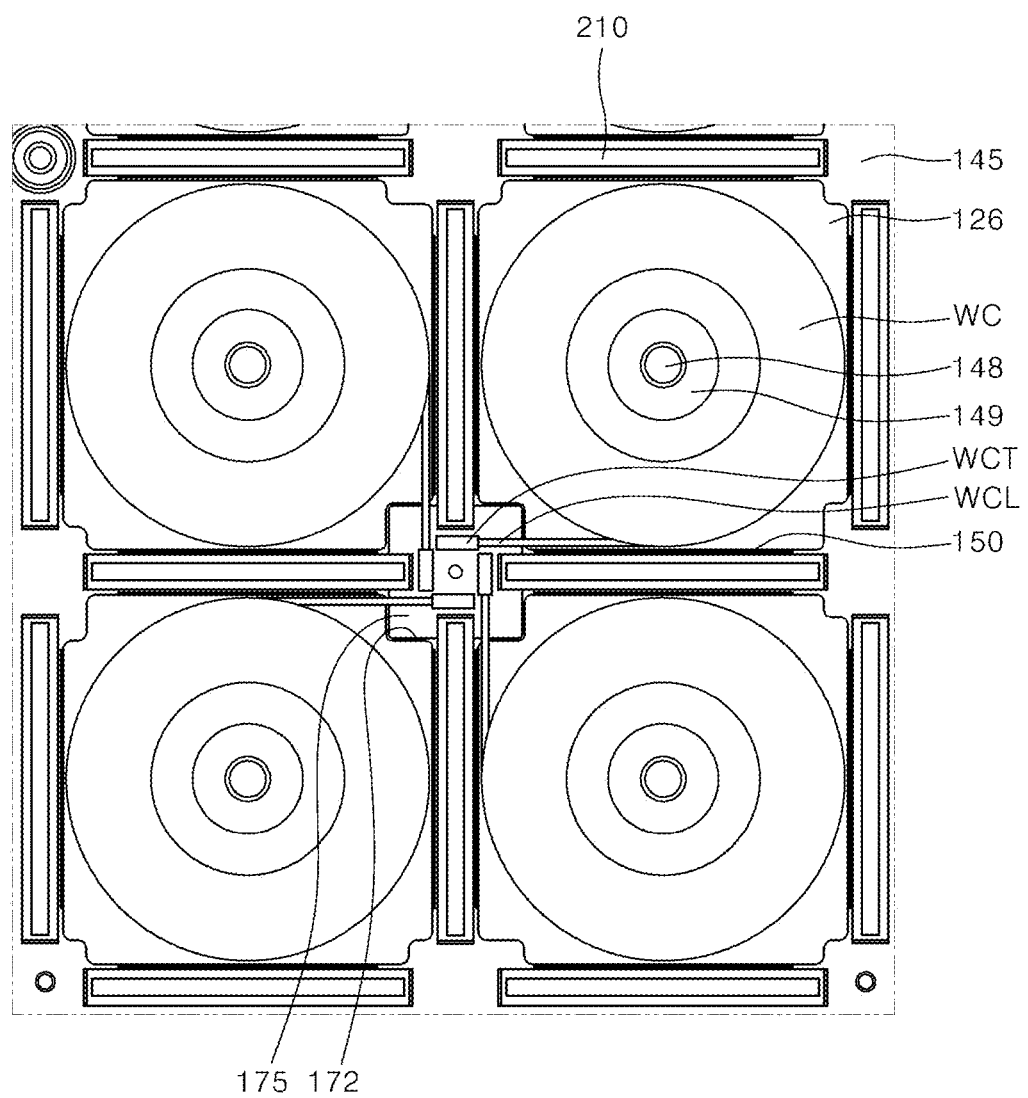

FIG. 3 is a plan view showing an example of an induction heating device according to the present disclosure. FIG. 4 is an exploded perspective view showing the induction heating device in FIG. 3. FIG. 5 is a cross-sectional view showing the induction heating device in FIG. 4. FIGS. 6 to 8 are partially enlarged views showing the induction heating device in FIG. 3.

For convenience of explanation, in FIGS. 3 and 6 to 8, the cover plate is omitted. For convenience of explanation, in FIG. 6, a light guide is omitted.

Referring to FIGS. 3 to 8, an induction heating device 1 may include a case 125, a cover plate 119, a base plate 145, and an indicator substrate support 170, an indicator substrate 175, a light emitting element 177, a light guide 210, electromagnetic interference (EMI) filter 235, a switched mode power supply (SMPS) 236, a first blowing fan 240, a second blowing fan 250, a third blowing fan 260, an input interface 300, and a controller for input interface 310, a working coil assembly WCA, a resonance substrate R_PCB, and an inverter substrate IV_PCB.

In some examples, the case 125 may include various types of components included in the induction heating device 1, for example, the working coil assembly WCA, the base plate 145, the indicator substrate support 170, the indicator substrate 175, the light emitting element 177, the light guide 210, the EMI filter 235, the SMPS 236, a first blowing fan 240, a second blowing fan 250, a third blowing fan 260, the controller for input interface 310, the resonance substrate R_PCB, and the inverter substrate IV_PCB.

In some examples, the case 125 may include various types of devices related to the driving of the working coil WC. For example, the case 125 may include a power supply that provides an alternating current (AC) power (i.e., input power), a controller for an inverter substrate that controls the driving of components of the inverter substrate IV_PCB, a relay or a semiconductor switch that turns on or turns off the working coil WC, but details of the various types of devices related to the driving of the working coil WC are omitted.

The case 125 may be thermally insulated to prevent heat generated by the working coil WC from being leaking to the outside.

In some examples, the case 125 may include a lower plate LPA and a side plate SPA that extends upward along an edge of the lower plate LPA.

Inlets and exhaust slits may be defined at a portion of an area of the lower plate LPA. Further, inlet slits IS_S and IS_L and an additional exhaust slit DS_S, may be defined in a remaining area of the lower plate LPA and the side plate SPA. Details of the inlet, inlet slit, and the exhaust slit are described below in detail.

In some implementations, an inlet and exhaust slit IDS may also be defined on the side plate SPA, and air may move to an inside of and to an outside of the case 125 through the inlet and exhaust slit IDS.

Further, a barrier BA may be installed at a periphery of an area, on the lower plate LPA of the case 125, where the controller for the input interface 310 is installed, and the barrier BA may extend upward from the periphery of the area where the controller for the input interface 310 is installed.

Specifically, the barrier BA may be made of, for example, metal, and may prevent heat generated due to the driving of peripheral components from being introduced into the controller for the input interface 310 and the input interface 300.

In some implementations, a silicone rubber may be inserted between an upper end of the barrier BA and a lower surface of the top plate 115.

A mica sheet MS may be provided between the lower plate LPA and the inverter substrate IV_PCB to insulate the lower plate LPA and the inverter substrate IV_PCB, of the case 125.

Specifically, one surface of the mica sheet MS may be attached to the lower plate LPA through a sealant, and the other surface of the mica sheet MS may contact a heat sink (i.e., a heat sink that radiates the heat for the inverter described below) provided in the inverter substrate IV_PCB.

Further, the first blowing fan 240 and the second blowing fan 250 may be installed on the lower plate LPA of the case 125.

In detail, the first blowing fan 240 may be installed on the lower plate LPA, and suction external air through the inlet provided in the lower plate LPA to discharge the air to the inverter substrate IV_PCB.

More specifically, the air is discharged from the first blowing fan 240 to the inverter substrate IV_PCB and is guided rearward through the inverter substrate IV_PCB. The air guided rearward may be discharged below the lower plate (LPA) (i.e., the outside of the case 125) through the exhaust slit provided on the lower plate LPA.

As described above, as heat generated by the inverter substrate IV_PCB is easily discharged below the lower plate LPA, it is possible to resolve the heating of the inverter substrate IV_PCB, in particular, the inverter. That is, a temperature of the inverter may be reduced due to the air discharged from the first blowing fan 240 to the inverter substrate IV_PCB.

In some implementations, the second blowing fan 250 may be installed on the lower plate (LPA) and may suction the outside air through the inlet provided in the lower plate (LPA) and may discharge the air to the resonance substrate R_PCB.

More specifically, the air is discharged from the second blowing fan 250 to the resonance substrate R_PCB and is guided rearward through the resonance substrate R_PCB. The air guided rearward may be discharged below the lower plate LPA (i.e., the outside of the case 125) through the exhaust slit provided in the lower plate LPA.

As described above, as the heat generated by the resonance substrate R_PCB is easily discharged below the lower plate LPA, it is possible to solve the heating of the resonance substrate R_PCB, in particular, the resonance capacitor. That is, the temperature of the resonance capacitor may be reduced due to the air discharged from the second blowing fan 250 to the resonance substrate R_PCB.

The cover plate 119 may be coupled to an upper end of the case 125 (i.e., an upper end of the side plate SPA) to close an inside of the case 125, and an object may be disposed on the upper surface of the cover plate 119.

Specifically, the cover plate 119 may include a top plate 115 to place the object such as a cooking vessel, the heat generated by the working coil WC may be transmitted to the object through the top plate 115.

The top plate 115 may be made of, for example, glass. Further, the input interface 300 may be flatly buried in the top plate 115 to receive input from a user and transmits the input to the controller for input interface 310, but is not limited. That is, the input interface 300 may be installed at a position other than the top plate 115.

In some implementations, the input interface 300 is a module that inputs a heating intensity or driving time of the induction heating device 1 desired by the user, and may be variously implemented with a physical button or a touch panel. Further, the input interface 300 may include, for example, a power button, a lock button, a power level control button (+,−), a timer control button (+,−), a charging mode button, and the like, and may display a specific image (e.g., an image of a heating zone, an image of a heating intensity, and the like).

Further, the input interface 300 may transfer the input received from the user to the controller for the input interface 310, and the controller for the input interface 310 may transfer the input to the above-described controller (i.e., the controller for the inverter substrate). Details thereof are omitted.

In some implementations, the working coil assembly WCA may include a working coil WC, a ferrite core 126, and a first mica sheet 120 (which is different from the above-mentioned mica sheet MS), an insulating member 150.

In some implementations, when the induction heating device 1 is a zone-free type induction heating device, a plurality of working coil assemblies WCAs may be present as shown in FIGS. 3 to 8, and a plurality of working coil assemblies (e.g., the WCAs) may be spaced apart from one another by a predetermined distance.

However, for convenience of description, one working coil assembly WCA is described.

Specifically, the working coil WC may include a conducting wire annularly wound with a plurality of times and may generate an alternating magnetic field. Further, the first mica sheet 120 and the ferrite core 126 may be sequentially disposed below the working coil WC.

In some implementations, the size of the working coil WC may not be reduced, and thus the AC magnetic field having a high-output may be generated.

The ferrite core 126 may be disposed below the working coil WC, and a core hole 127 (see FIG. 9) may be defined at a central portion of the ferrite core 126 to overlap with an annular inner side of the working coil WC in a height direction HD toward which the base plate, the ferrite core, the first mica sheet, and the working coil are stacked.

Specifically, the base plate 145 may be disposed below the ferrite core 126, and a first mica sheet 120 may be disposed between the ferrite core 126 and the working coil WC.

The ferrite core 126 may be fixed to the first mica sheet 120 through the sealant, and may function to diffuse an alternating magnetic field generated by the working coil WC upward (i.e., above the ferrite core 126).

Further, an insulating member 150 may be attached to the outer portion of the ferrite core 126, and a corner of the ferrite core 126 may be bent stepwise.

The first mica sheet 120 may be provided between the working coil WC and the ferrite core 126 and a first sheet hole 121 (see FIG. 9) may be provided at a center of the first mica sheet 120 to overlap with the annular inner side of the working coil WC in the height direction HD toward which the base plate, the ferrite core, the first mica sheet, and the working coil are stacked.

Specifically, the first mica sheet 120 may be fixed to the working coil WC and the ferrite core 126 through the sealant, and may prevent the heat generated by the working coil WC from being directly transferred to the ferrite core 126.

In some implementations, the induction heating device 1 may further include a second mica sheet fixed to the upper end of the working coil WC through the sealant and defining a second sheet hole at the center of the second mica sheet to overlap with the annular inner side of the working coil WC in a height direction HD thereof, but details of the above configuration are omitted.

The insulating member 150 may be attached to an outer portion of the ferrite core 126 to insulate between the working coil WC and the base plate 145.

Further, the insulating member 150 may include, for example, a Kapton tape.

As shown in FIGS. 6 to 8, the working coil assembly WCA further includes a packing gasket 149 that fixes the first mica sheet 120 and the ferrite core 126 to the base plate 145 and a sensor 148 installed at an upper end of the packing gasket 149 to detect a temperature, and the like.

In some implementations, the sensor 148 may detect the temperature of the top plate 115, the temperature of the working coil WC, and the operation of the working coil WC, and may transmit temperature information or operation information to the above-mentioned controller for input interface 310.

As described above, the working coil assembly WCA includes the above-mentioned components, and details of components are described below.

The working coil assembly WCA is installed on an upper surface of the base plate 145.

Specifically, the ferrite core 126, the first mica sheet 120, and the working coil WC are sequentially stacked on the base plate 145, and the base plate 145 may be spaced upward from the indicator substrate support 170.

Further, the base plate 145 may be integrated, for example, and may be made of aluminum (A), but is not limited thereto.

In some implementations, the indicator substrate 175 may be installed on the upper surface of the indicator substrate support 170 and may be spaced downward from the base plate 145. Accordingly, an air flow path described below may be provided between the base plate 145 and the indicator substrate 175. Details thereof are described below.

In some implementations, as shown in FIGS. 6 to 8, a connection hole 172 may be provided in the space between the ferrite cores on the base plate 145 to provide a space of the connector 171.

The connector 171 may protrude upward from the upper surface of the indicator substrate 175 to arrange wires and perform electrical connection of the working coil WC. That is, a terminal (WCT; i.e., a common terminal) of the working coil WC provided at the periphery thereof may be connected to the connector 171.

In some implementations, the working coil WC may include a common terminal WCT connected to (i.e., coupled to) the connector 171, with terminals of the surrounding working coils and an individual terminal connected to the resonance substrate described below (R_PCB in FIG. 4; i.e., the resonance capacitor). Further, the common terminal WCT and the individual terminal are respectively connected to the conducting wire WCL of the working coil WC, and the common terminal WCT is connected to the inverter substrate (IV_PCB in FIG. 4; i.e., the inverter) described above). Details thereof are omitted.

The third blowing fan 260 may be installed at one side of the lower surface of the base plate 145 and may suction the outside air (e.g., outside cool air) through the inlet slits IS_L and IS_S defined in the lower plate LPA and the side plate SPA of the case 125, and may discharge the air to the air flow path defined between the base plate 145 and the indicator substrate 175.

More specifically, as shown in FIG. 4, an upper fence HDF is provided on the upper surface of the indicator substrate support 170 and the upper fence HDF is provided along an edge of the upper surface of the indicator substrate support 170. The air flow path may be surrounded by the lower surface of the base plate 145, the upper surface of the indicator substrate 175, and the upper fence HDF.

Further, the base plate 145 may be integrated, and the air flow path may be surrounded by the lower surface of the base plate 145, the upper surface of the indicator substrate 175, and the upper fence HDF. The air is discharged from the third blowing fan 260 to the air flow path and may be discharged to the outside of the case 125 through the additional exhaust slits DS_S. The air is discharged by the third blowing fan 260 may move through the air flow path, to reduce the temperature of the working coil WC and the temperature of the indicator (in particular, a plurality of light emitting elements 177).

That is, as the cool air is circulated through the air flow path, the temperature of the working coil WC and the temperature of the indicator (in particular, the plurality of light emitting elements 177 may be reduced. Further, the heating of the working coil WC and the indicator (in particular, the plurality of light emitting elements 177) generated due to radiation and a convection current may be resolved.

The light guide 210 may be installed on the base plate 145.

Specifically, the light guide 210 may be installed on the base plate 145 to be provided around the working coil WC. That is, four light guides 210 per one working coil WC may be installed around the working coil WC (i.e., light guides are arranged on four surfaces of the outer portions of the working coil).

The light guide 210 may display whether the working coil WC is driven and output intensity of the working coil WC through a light emitting surface (i.e., an upper surface).

As shown in FIGS. 6 and 7, a light guide installation hole 147 to install the light guide 210 may be defined in the space between the ferrite cores, in the base plate 145. That is, the light guide installation hole 147 may be defined in the base plate 145 at the position in which the light guide 210 is installed. Accordingly, the light guide installation hole 147 may also be defined around the working coil WC, and four light guide installation holes 147 per one working coil WC may be defined around the working coil WC.

In some examples, the light guide installation hole 147 may not overlap with a connection hole 172, and the number of the light guide installation holes 147 may be the same as the number of the light guides 210.

In some implementations, light emitted by the light emitting element 177 installed on the indicator substrate 175 may be transmitted to the light guide 210 through the light guide installation hole 147, and the light guide 210 may display the light emitted by the light emitting element 177 through the light emitting surface (i.e., the upper surface) at the upper end thereof.

The indicator substrate 175 may be installed on the upper surface of the indicator substrate support 170 to be spaced downward from the base plate 145, and a plurality of light emitting elements 177 may be installed on the upper surface of the indicator substrate 175. The plurality of light emitting elements 177 may be, for example, light emitting diodes (LEDs), and the plurality of light emitting elements 177 may be symmetrical with respect to a center of the lower surface of the light guide 210, but is not limited thereto.

In some implementations, the indicator substrate 175 may have, for example, a form of a printed circuit board (i.e., PCB), and may drive a plurality of light emitting elements 177 based on the control signal received from the above-mentioned controller for the inverter substrate or the controller for the input interface 310. In some examples, various types of components may further be installed in the indicator substrate 175 to drive the plurality of light emitting elements 177.

The indicator substrate support 170 may be coupled to the lower plate LPA to be disposed below the working coil WC.

Further, the above-described upper fence HDF may be provided on the upper surface of the indicator substrate support 170, and a lower fence LDF may be provided on the lower surface of the indicator substrate support 170.

That is, the upper fence HDF of the indicator substrate support 170 supports the lower surface of the base plate 145, and the lower fence LDF of the indicator substrate support 170 may be supported by the lower plate LPA.

Further, the indicator substrate 175 may be installed on the upper surface of the indicator substrate support 170 and the EMI filter 235, the SMPS 236, the resonance substrate R_PCB, and the inverter substrate IV_PCB may be installed on the lower surface of the indicator substrate support 170.

The EMI filter 235 may be installed on the lower surface of the indicator substrate support 170 and may receive the AC power from the above-described power supply. Further, the EMI filter 235 may reduce noise of the received AC power (i.e., electro-magnetic interference (EMI)) and provide the SMPS 236 with the AC power with reduced noise.

The SMPS 236 may be installed on the lower surface of the indicator substrate support 170, and may receive, from the EMI filter 235, the AC power with reduced noise. Further, the SMPS 236 may convert the received AC power into DC power and may provide the inverter substrate IV_PCB with the converted DC power.

The inverter substrate IV_PCB may be installed on the lower surface of the indicator substrate support 170 and may include the inverter that applies the resonance current to the working coil WC through the switching operation and a heat sink that radiates heat of the inverter.

The inverter IV may receive the DC power from the SMPS 236 and may apply a resonance current to the working coil WC by performing a switching operation based on the received DC power.

Further, a plurality of inverters may be provided, and the switching of the inverter may be controlled by the controller for the inverter substrate described above.

The inverter may include two switching elements, and the two switching elements may be alternately turned on and off based on a switching signal received from the controller for the inverter substrate. Further, high frequency alternating current (i.e., resonance current) may be generated through the switching of the two switching elements, and the generated high frequency alternating current may be applied to the working coil WC.

The resonance substrate R_PCB may be installed on the lower surface of the indicator substrate support 170, and may include a resonance capacitor connected to the working coil WC to resonate by the switching of the inverter IV and a heat sink HS2 that radiates the heat of the resonance capacitor.

The resonance capacitor resonates, when a resonance current is applied to the working coil WC by the switching operation of the inverter. Further, when the resonance capacitor resonates, a current flowing through the working coil WC connected to the resonance capacitor C increases. That is, an eddy current may be induced into the object disposed above the working coil WC connected to the resonance capacitor through this process.

In some implementations, a plurality of resonance capacitors may be provided.

In some implementations, according to an implementation of the present disclosure, the induction heating device 1 may also perform a function for transmitting wireless power based on the above-mentioned configuration and feature.

That is, power is wirelessly supplied and is applied to a plurality of electronic devices. Electronic devices that use a technology for transmitting wireless power are charged by simply placing the electronic devices on a charging pad without connecting the electronic device to an additional charge connector. The electronic devices that transmit the wireless power may not require a wired cord or a charger, thereby improving portability of the electronic devices and reducing a size and a weight of the electronic devices.

The technology for transmitting the wireless power may use an electromagnetic induction method using a coil, a resonance method using resonance, and a radio wave radiation method in which electrical energy is converted into a microwave and the converted microwave is transmitted. The electromagnetic induction method uses electromagnetic induction between a primary coil (e.g., a working coil WC) provided in a device that transmits wireless power and a secondary coil provided in a device that receives wireless power to transmit the power.

In some examples, the induction heating method of the induction heating device 1 substantially has the same principle as the technology for transmitting the wireless power using electromagnetic induction in that the object is heated by electromagnetic induction.

Therefore, according to an implementation of the present disclosure, the induction heating device 1 may perform a function for transmitting the wireless power, as well as performing a function of induction heating. Further, an induction heating mode or a wireless power transmission mode may be controlled by the controller for the input interface (or the controller for the input interface 310). Thus, the function for inductively heating the object or the function for transmitting the wireless power may be selectively performed as necessary.

As described above, the induction heating device 1 according to the implementation of the present disclosure has the above-described configuration and features. The working coil assembly WCA shown in FIG. 3 is described below in detail.

Figure 9:
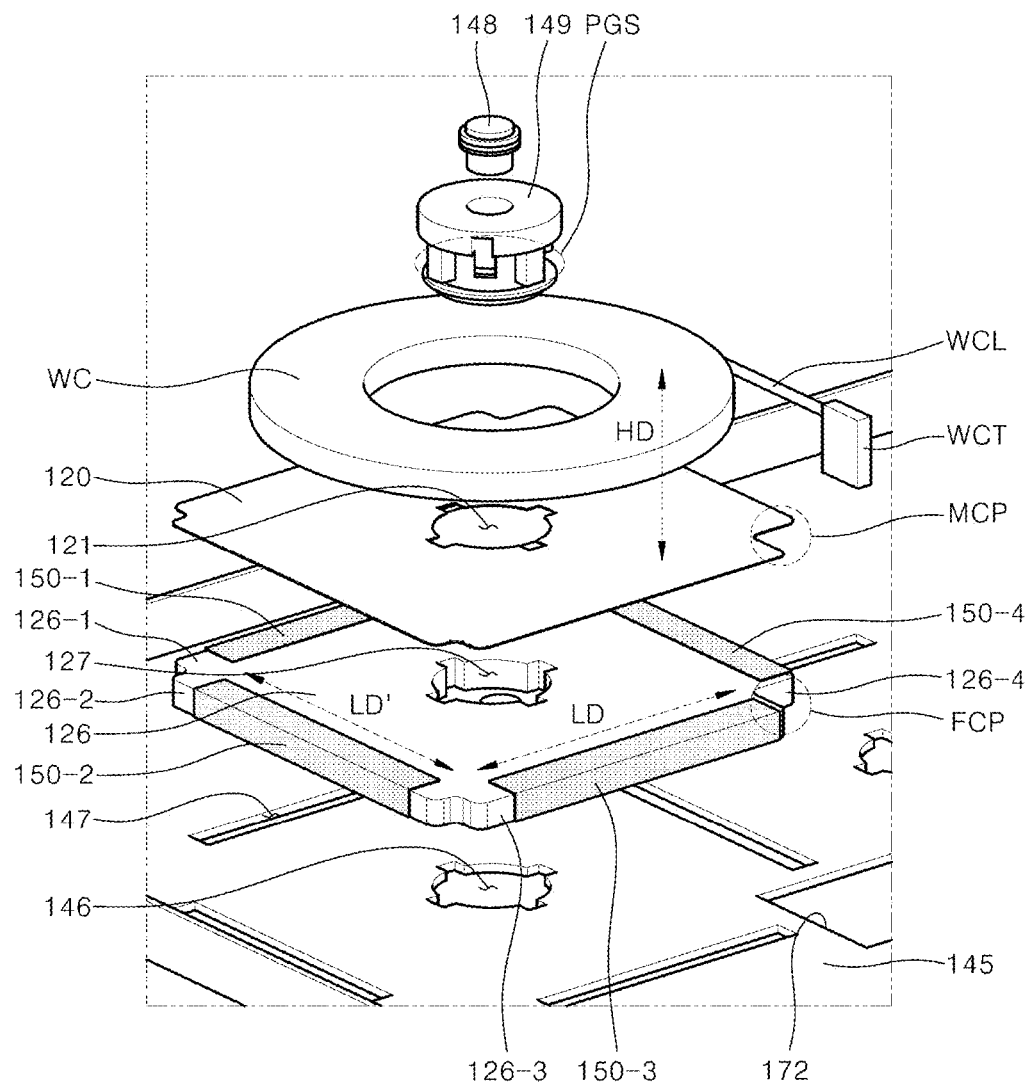
FIGS. 9 to 11 are views showing examples of working coil assemblies of the induction heating device in FIG. 3.
Figure 10:
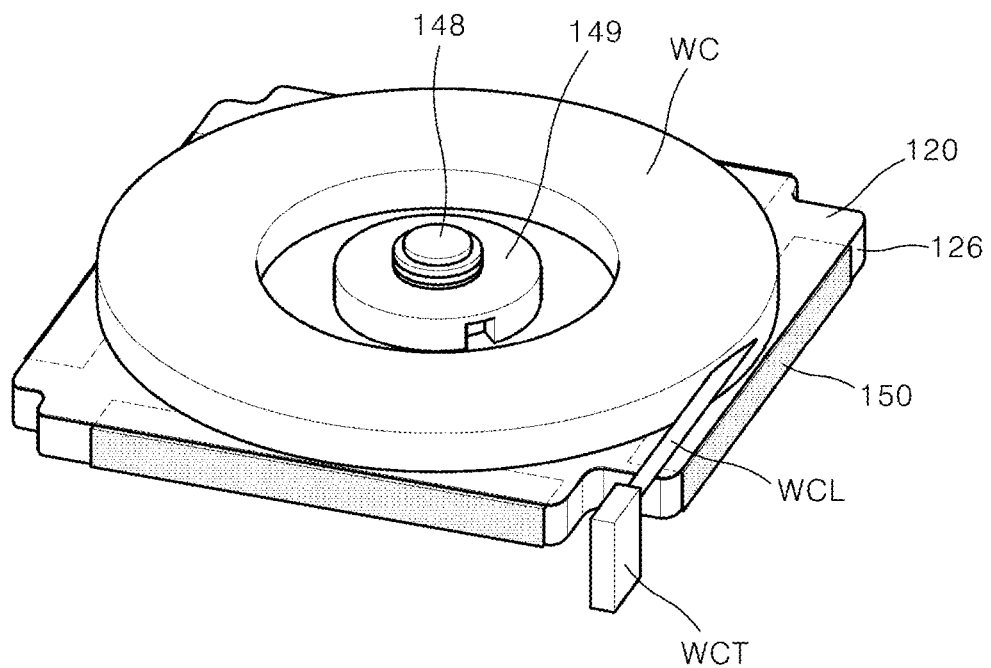
Figure 11:
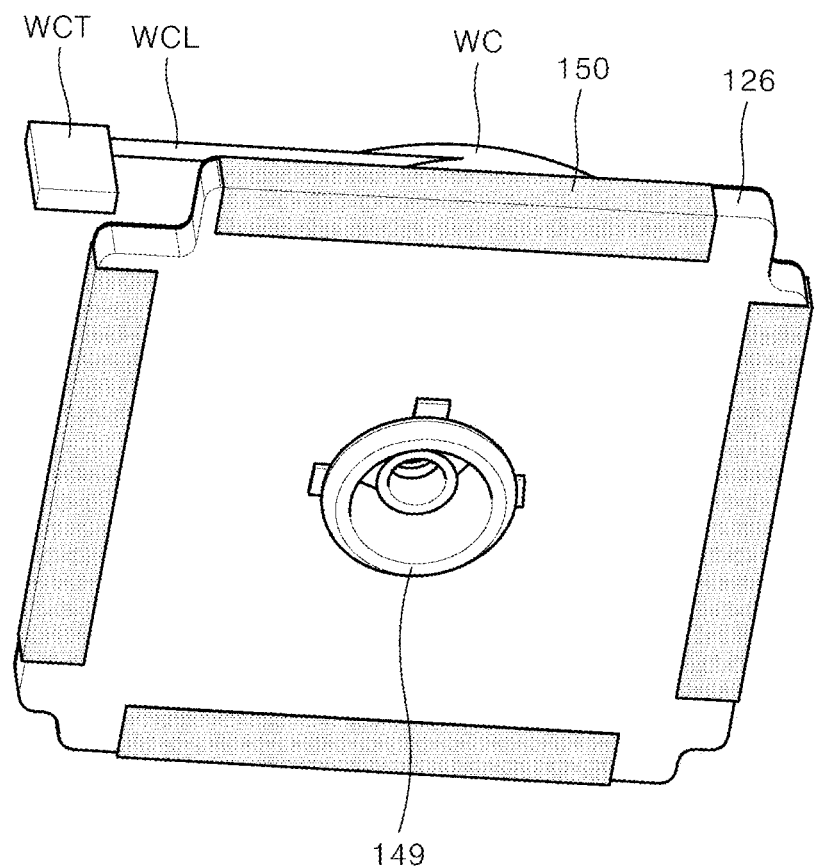

FIGS. 9 to 11 show the working coil assembly shown in FIG. 3.

In some implementations, the working coil assembly WCA (see FIG. 3) is summarized above. The matter which is not described above is described below.

As described above, referring to FIGS. 9 to 11, the working coil assembly WCA may include a working coil WC, a ferrite core 126, a first mica sheet 120, a second mica sheet, an insulating member 150, a packing gasket 149, and a sensor 148.

Specifically, a core hole 127 is defined at a center of the ferrite core 126 to overlap an annular inner side of the working coil WC in a height direction HD toward which the base plate, the ferrite core, the first mica sheet, and the working coil are stacked. A first sheet hole 121 may be defined at a center of the first mica sheet 120 to overlap with the annular inner side of the working coil WC in the height direction HD thereof. A plate hole 146 may be provided in the base plate 145 to overlap with the annular inner side of the working coil WC in the height direction HD toward which the base plate, the ferrite core, the first mica sheet, and the working coil are stacked. The core hole 127, the first sheet hole 121, and the plate hole 146 may be coaxially arranged along the height direction HD.

Further, as shown in FIG. 9, the core hole 127, the first sheet hole 121, and the plate hole 146 may have the same shape.

A cross-sectional shape of an outer circumferential surface PGS of the packing gasket 149 inserted into the first sheet hole 121, the core hole 127, and the plate hole 146 may correspond to the shape of the first sheet hole 121.

Accordingly, the packing gasket 149 may fix the first mica sheet 120 and the ferrite core 126 to the base plate 145.

In some implementations, a plurality of plate holes 146 may be provided on the base plate 145 in consideration of the number of working coil assemblies.

In some examples, the four corners of the ferrite core (e.g., FCP) may be bent stepwise, and the four corners of the first mica sheet (e.g., MCP) may be bent stepwise. The four corners of the ferrite core may correspond to the four corners of the first mica sheet, respectively.

For example, the ferrite core 126 may include a step portion that is recessed from each of (i) a first corner between the first outer portion 126-1 and the second outer portion 126-2, (ii) a second corner between the second outer portion 126-2 and the third outer portion 126-3, (iii) a third corner between the third outer portion 126-3 and the fourth outer portion 126-4, and (iv) a fourth corner between the fourth outer portion 126-4 and the first outer portion 126-1. The first mica sheet 120 may include a step part that is disposed at each corner of the first mica sheet 120 and that corresponds to one of the step portions of the ferrite core 126. Each of the insulating members 150-1 to 150-4 may be disposed between two corners. For instance, the third insulating member 150-3 may be disposed between the second corner and the third corner. In some cases, a distance between a first end of the third insulating member 150-3 and the second corner is greater than or equal to a distance between a second end of the third insulating member 150-3 and the third corner.

Accordingly, a space for the connection hole 172 provided on the base plate 145 may be provided.

Further, the ferrite core 126 may include four outer portions, and the insulating member 150 may include four insulating members attached to the four outer portions of the ferrite core 126, respectively.

Specifically, the ferrite core 126 may include a first outer portion 126a, a second outer portion 126b, a third outer portion 126c, and a fourth outer portion 126d. The second outer portion 126b extends in a direction orthogonal to a first longitudinal direction LD of the first outer portion 126a and the third outer portion 126c extends in a direction orthogonal to a second longitudinal direction LD' of the second outer portion 126b and parallel to the longitudinal direction LD of the first outer portion 126a, and a fourth outer portion 126d extends in a direction orthogonal to the longitudinal direction LD of the first outer portion 126a and a longitudinal of the third outer portion 126c and parallel to the longitudinal direction LD' of the second outer portion 126b.

In some implementations, the longitudinal directions LD of the first outer portion 126a and the third outer portion 126c may be the same, and the longitudinal directions LD' of the second outer portion 126b and the fourth outer portion 126d may be the same. In some examples, the longitudinal directions LD of the first outer portion 126a and the third outer portion 126c and the longitudinal directions LD' of the second outer portion 126b and fourth outer portion 126d may be perpendicular to each other.

Further, the insulating member 150 may include a first insulating member 150-1 to a fourth insulating member 150-4 attached to the first outer portion 126a to the fourth outer portion 126d, respectively.

The first insulating member 150-1 may be attached to the first outer portion 126a to surround an upper surface, a side surface, and a lower surface of the first outer portion 126a. The second insulating member 150-2 may be attached to the second outer portion 126b to surround an upper surface, a side surface, and a lower surface of the second outer portion 126b. Further, the third insulating member 150-3 may be attached to the third outer portion 126c to surround an upper surface, a side surface, and a lower surface of the third outer portion 126c. The fourth insulating member 150-4 may be attached to the fourth outer portion 126d to surround an upper surface, a side surface, and a lower surface of the fourth outer portion 126d.

The length corresponding to the longitudinal direction LD of the first insulating member 150-1 may be less than the length corresponding to the longitudinal direction LD of the first outer portion 126a. The length corresponding to the second insulating member 150-2 may be less than the length corresponding to the longitudinal direction LD' of the second outer portion 126b. Further, the length corresponding to the longitudinal direction LD of the third insulating member 150-3 may be less than the length corresponding to the longitudinal direction LD of the third outer portion 126c. The length corresponding to the longitudinal direction LD' of the fourth insulating member 150-4 may be less than the length corresponding to the longitudinal direction LD' of the fourth outer portion 126d.

In some implementations, the length of the longitudinal direction of the insulating member 150 may be used only to center portions of the outer portions 126a to 126d as little as possible. In some implementations, in consideration of assembly tolerance, the insulating member 150 may have a length such that the insulating member 150 may cover a half or more of the outer portions 126a to 126d. The insulating member 150 covers the upper surface, the side surface, and the lower surface of the outer portions 126a to 126d to minimize a possibility that electric shock accidents may occur.

In some examples, where the working coil WC has a rectangular structure rather than a circular structure, an insulating member may be provided to cover not only the outer portions 126a to 126d of the ferrite core 126 but also corners (e.g., FCPs).

As described above, as the insulating member 150 is attached to the outer portions 126a to 126d of the ferrite core 126 made of a non-insulating material, the creepage distance between the lower surface of the working coil WC and the base plate 145 may meet a standard (e.g., 6.4 mm or more) to prevent the electric shock accidents.

As described above, according to an implementation of the present disclosure, the induction heating device 1 may use a high-output working coil, thereby improving performance and reliability of the product.

Further, according to an implementation of the present disclosure, the induction heating device 1 may prevent the electric shock accidents by providing the creepage distance to insulate the working coil, thereby improving user satisfaction.

While the present disclosure has been described with reference to exemplary drawings thereof, it is to be understood that the present disclosure is not limited to implementations and drawings in the present disclosure, and various changes can be made by the skilled person in the art within the scope of the technical idea of the present disclosure. Although working effects obtained based on configurations of the present disclosure are not explicitly described while describing the implementations of the present disclosure, effects predictable based on the configurations have also to be recognized.

What is claimed is:

1. An induction heating device, comprising:
a base plate;
a working coil disposed vertically above the base plate, the working coil comprising a conducting wire that is annularly wound;
a ferrite core that is disposed on an upper surface of the base plate, that is disposed vertically below the working coil, and that is configured to direct upward an alternating magnetic field generated by the working coil; and
an insulating member attached to an outer portion of the ferrite core and configured to electrically insulate the working coil from the base plate,
wherein the outer portion extends along a longitudinal direction of the ferrite core, and
wherein a length of the insulating member in the longitudinal direction is less than a length of the outer portion in the longitudinal direction.

2. The induction heating device of claim 1, wherein the outer portion of the ferrite core comprises:
a first outer portion that extends along a first longitudinal direction;
a second outer portion that extends along a second longitudinal direction orthogonal to the first longitudinal direction;
a third outer portion that is spaced apart from the first outer portion in the second longitudinal direction and that extends parallel to the first longitudinal direction; and
a fourth outer portion that is spaced apart from the second outer portion in the first longitudinal direction and that extends parallel to the second longitudinal direction, and
wherein the insulating member comprises a first insulating member attached to the first outer portion, a second insulating member attached to the second outer portion, a third insulating member attached to the third outer portion, and a fourth insulating member attached to the fourth outer portion.

3. The induction heating device of claim 2, wherein the first insulating member surrounds an upper surface, a side surface, and a lower surface of the first outer portion,
wherein the second insulating member surrounds an upper surface, a side surface, and a lower surface of the second outer portion,
wherein the third insulating member surrounds an upper surface, a side surface, and a lower surface of the third outer portion, and
wherein the fourth insulating member surrounds an upper surface, a side surface, and a lower surface of the fourth outer portion.

4. The induction heating device of claim 2, wherein the ferrite core further comprises a step portion that is recessed from each of (i) a first corner between the first outer portion and the second outer portion, (ii) a second corner between the second outer portion and the third outer portion, (iii) a third corner between the third outer portion and the fourth outer portion, and (iv) a fourth corner between the fourth outer portion and the first outer portion.

5. The induction heating device of claim 4, further comprising a first mica sheet disposed between the working coil and the ferrite core and configured to block heat transfer from the working coil to the ferrite core, and wherein the first mica sheet comprises a step part that is disposed at each corner of the first mica sheet and that corresponds to one of the step portions of the ferrite core.

6. The induction heating device of claim 4, wherein:
the first insulating member is attached to the first outer portion between the fourth corner and the first corner;
the second insulating member is attached to the second outer portion between the first corner and the second corner;
the third insulating member is attached to the third outer portion between the second corner and the third corner; and
the fourth insulating member is attached to the fourth outer portion between the third corner and the fourth corner.

7. The induction heating device of claim 6, wherein a distance between a first end of the first insulating member and the first corner is greater than or equal to a distance between a second end of the first insulating member and the fourth corner.

8. The induction heating device of claim 1, wherein the insulating member comprises a Kapton tape.

9. The induction heating device of claim 1, further comprising a first mica sheet disposed between the working coil and the ferrite core and configured to block heat transfer from the working coil to the ferrite core.

10. The induction heating device of claim 9, wherein the first mica sheet is fixed to each of the working coil and the ferrite core by a sealant.

11. The induction heating device of claim 9, wherein a creepage distance between a lower surface of the working coil and the base plate is greater than or equal to 6.4 mm.

12. The induction heating device of claim 9, wherein the base plate, the ferrite core, the first mica sheet, and the working coil are stacked along a height direction,
wherein the ferrite core defines a core hole at a center area of the ferrite core that corresponds to an annular inner side of the working coil,
wherein the first mica sheet defines a first sheet hole at a center area of the first mica sheet that corresponds to the annular inner side of the working coil,
wherein the base plate defines a plate hole at a position corresponding to the annular inner side of the working coil, and
wherein the core hole, the first sheet hole, and the plate hole have a same shape and are coaxially arranged along the height direction.

13. The induction heating device of claim 12, further comprising:
a packing gasket that is configured to fix the first mica sheet and the ferrite core to the base plate and that is inserted into the first sheet hole, the core hole, and the plate hole; and
a sensor disposed at an upper end of the packing gasket and configured to detect a temperature of the packing gasket,
wherein an outer circumferential shape of the packing gasket corresponds to a circumferential shape of the first sheet hole.

14. The induction heating device of claim 13, wherein the packing gasket has a circular shape and is configured to be disposed within the inner annular side of the working coil, and
wherein an outer circumferential surface of the packing gasket faces the inner annular side of the working coil.

15. The induction heating device of claim 13, wherein the packing gasket comprises a plurality of protrusions that protrude outward from an outer circumferential surface of the packing gasket, and
wherein the first mica sheet further defines a plurality of grooves that extend outward from the first sheet hole and that are configured to receive the plurality of protrusions of the packing gasket.

16. The induction heating device of claim 15, wherein the plurality of grooves are arranged about the center area of the first mica sheet.

17. The induction heating device of claim 9, wherein the ferrite core comprises a step portion recessed from a corner of the ferrite core, and
wherein the first mica sheet comprises a step part that is recessed from at a corner of the first mica sheet and that corresponds to the step portion of the ferrite core.

18. The induction heating device of claim 1, wherein the base plate is made of aluminum (Al).

* * * * *